Aug. 17, 1954    D. J. JORDAN    2,686,631
COOLANT INJECTION SYSTEM FOR GAS TURBINES
Filed May 8, 1948    2 Sheets-Sheet 2

INVENTOR.
BY Donald J. Jordan
ATTORNEY

Patented Aug. 17, 1954

2,686,631

UNITED STATES PATENT OFFICE 2,686,631

COOLANT INJECTION SYSTEM FOR GAS TURBINES

Donald J. Jordan, Milford, Conn., assignor to United Aircraft Corporation, East Hartford, Conn., a corporation of Delaware Application May 8, 1948, Serial No. 25,955

6 Claims. (Cl. 230—209)

This invention relates to improvements in coolant injection systems for gas turbine engines. More specifically this invention relates to an improved mechanism for injecting a coolant liquid into the compressor intake of gas turbine power plants adaptable for use in aircraft to improve their efficiency and power output.

It is an object of this invention to provide an improved coolant injection system for compressors of gas turbine power plants.

It is a further object of this invention to provide a system for injecting a liquid coolant into a compressor of a gas turbine power plant to reduce the back-work ratio of the turbine cycle.

Another feature of this invention resides in the provision of improved means for injecting liquid coolant into the compressor of a gas turbine power plant to produce results similar to that obtained by use of an inter cooler, thereby increasing the efficiency of the compressor and the over-all efficiency of the turbine cycle.

A further feature of this invention resides in the provision for a coolant injection system for gas turbine power plants particularly adaptable for use with aircraft power plant installations.

These and other objects will become readily apparent from the following detailed description of the accompanying drawings which illustrate one embodiment of the invention.

In these drawings:

Fig. 4 is an enlarged partial cross sectional view of the fitting attachment through which the coolant is injected into the fluid-air injection casing.

It is a well-known, major characteristic of gas turbine power plants that a great deal of power is expended to operate the compressor and accessories during the normal cycle. This work which is put back into the power plant is often referred to as the "back-work ratio." The back-work ratio as here used is the ratio of the total mechanical work which is absorbed by compressors and other equipment necessary to the operation of the cycle divided by the total work generated by the turbines or other prime movers in the cycle.

For example, a typical gas turbine cycle may have a back-work ratio of as high as two-thirds. Accordingly, in such a case, two out of every three H. P. developed is used to drive compressors or is otherwise absorbed in the cycle to give a net output of one H. P. As a result, any inefficiency in either the power generating or the power absorption equipment rapidly cuts down the net output. A logical method for increasing the net output would be to increase the efficiency of the compressor. One obvious way would be to intercool the compressor at one or more stages. However, this is often mechanically difficult and inefficient.

An effect similar to intercooling can be obtained without actually removing heat from the cycle by injecting a mixture of air and finely divided liquid such as water in the intake of the compressor. In this way the heat of compression of the air is absorbed as latent heat in the water which is evaporated. This process, often referred to as "wet compression," reduces the work done by the compressor in much the same way as intercooling does. However, the net result is a reduction in work of compression and an increase in the total volume of compressed working fluid which is delivered by the compressor. This in turn reduces the back-work ratio and increases the net power output from the entire cycle.

Figure 1:
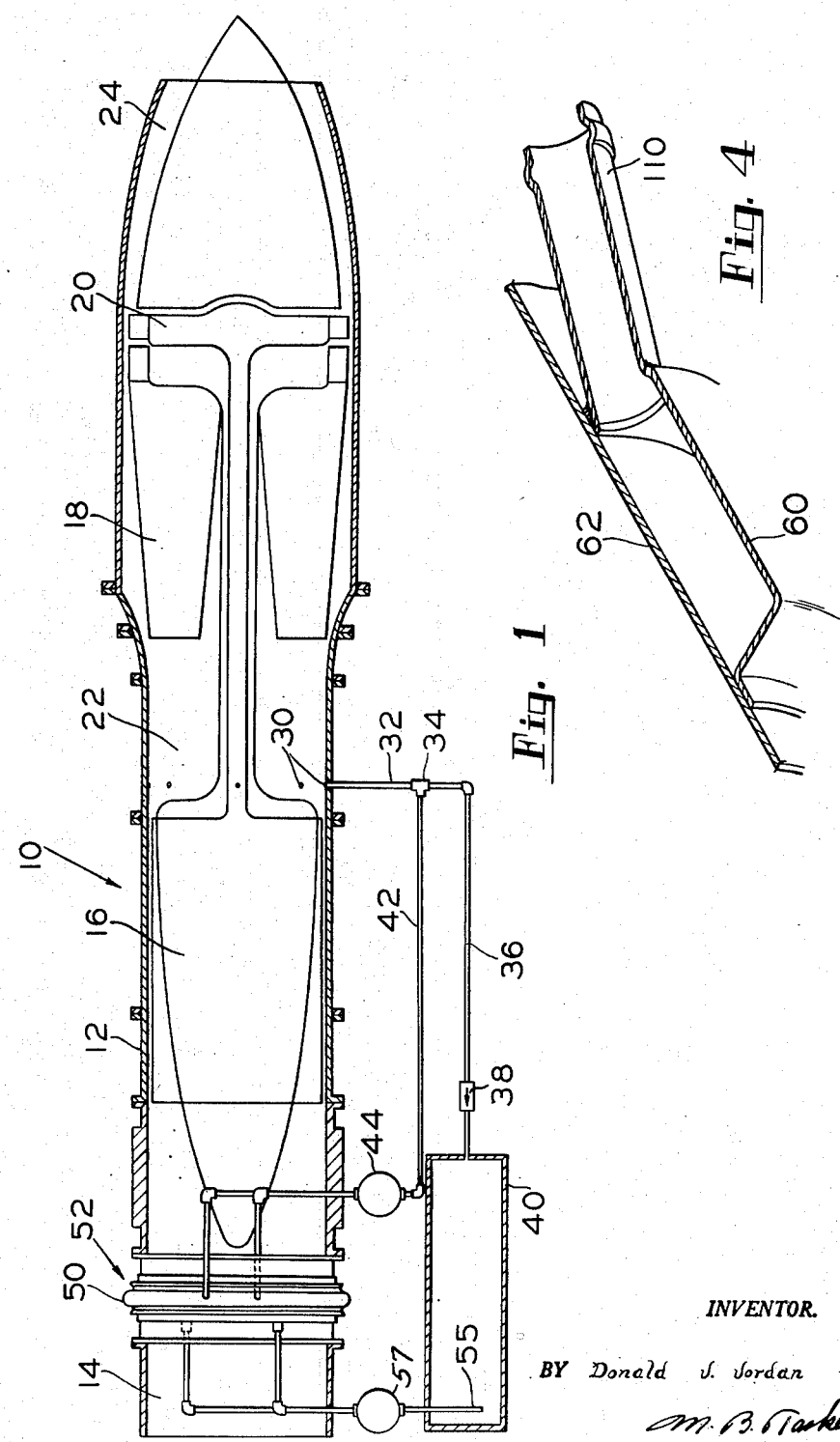
Fig. 1 is a partial cross sectional view of a gas turbine engine including a schematic view of the water injection system.

Referring to Fig. 1, a typical aircraft gas turbine jet power plant is generally indicated at 10. The power plant is comprised of an outer casing 12 forming an intake duct 14 and housing an axial flow compressor 16, a combustion chamber or generator 18 and a turbine 20. Air is normally ducted through the intake 14, through the compressor 16, then into the compressor outlet chamber 22, and through the combustion chamber 18. The gases from the combustion chamber enter the turbine 20 and are emitted through the jet exhaust chamber 24.

According to this invention a coolant injection system is provided for the power plant by forcing a liquid under pressure through a nozzle where it is mixed with compressed air to provide atomization and thereafter injected in the intake duct 14 of the compressor. For this purpose one or more holes 30 are provided in the periphery of the power plant casing 12 at the compressor outlet. The compressed air passes through the conduit 32 to the T-fitting 34. One leg of the T-fitting leads to the conduit 36 through the check valve 38 to provide a pressure within the liquid coolant tank 40. The other leg of the T-fitting 34 leads through the conduit 42, through a shut-off valve 44 and thence to an annular collar 50 on the cylindrical coolant injection assembly 52. A pipe 55 terminates beneath the liquid in the coolant tank 40 which permits the passage of liquid under pressure through the shut-off valve 57 to points of attachment on the collar 50. The pipe arrangement illustrated in Fig. 1 has been shown for the sake of simplicity. This arrangement can be modified in aircraft installations according to various well-known practices to insure constant liquid supply in all attitudes of flight.

Figures 2, 3:
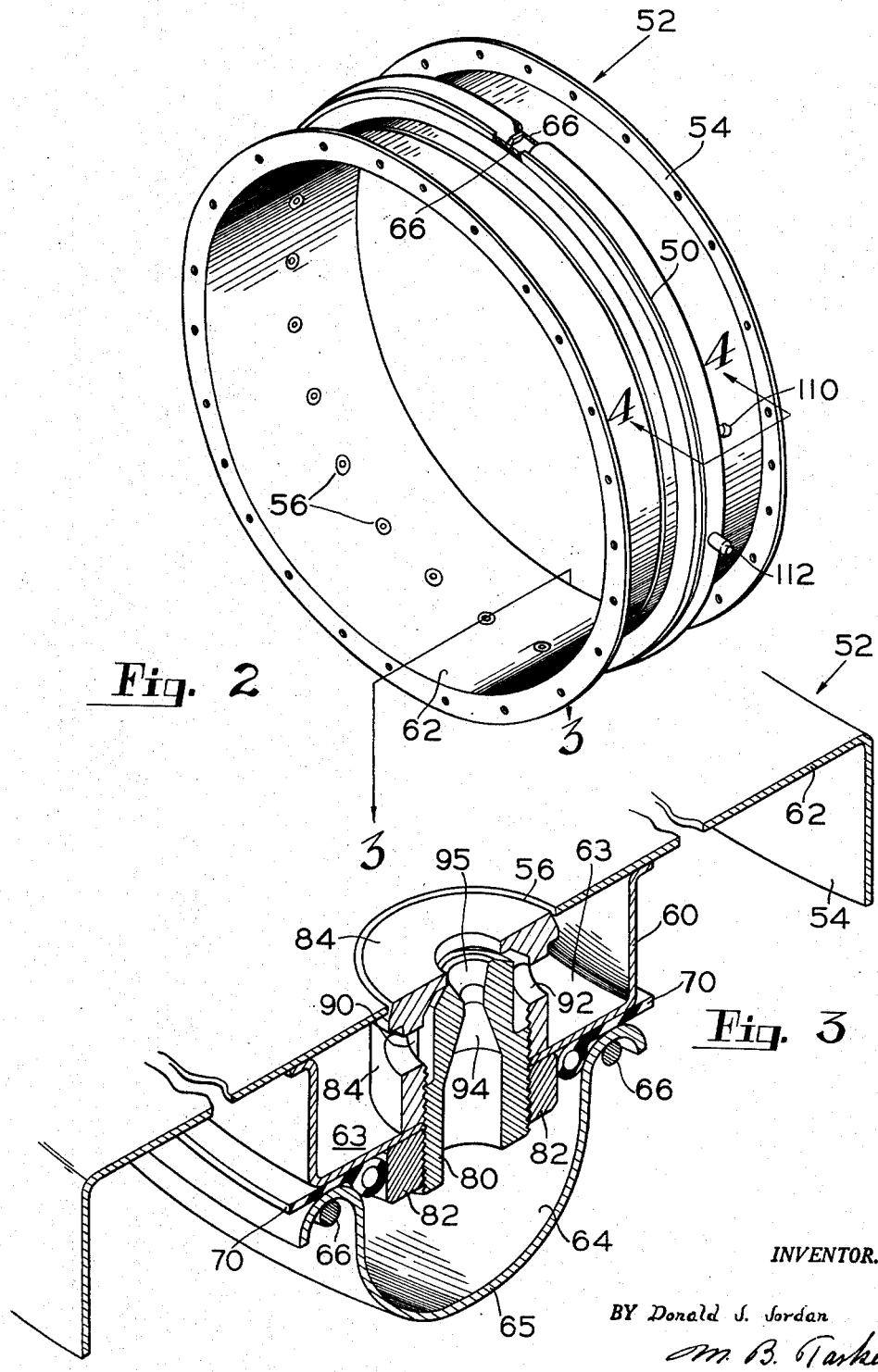
Fig. 2 is a perspective view of the turbine casing showing the arrangement of the coolant injection nozzles and external collar.
Fig. 3 is an enlarged perspective cross sectional view of the casing shown in Fig. 2 including a detailed perspective of the nozzle.

As is better shown in Figs. 2 and 3, the coolant injection assembly 52 has radially extending mounting flanges 54 for attaching it to the power plant casing 12. A series of nozzles 56 are mounted circumferentially in the assembly 52.

In order to provide separate chambers by which the liquid coolant and the compressed air can be supplied to the nozzles for mixing, a separable annular collar 50 is provided. The inner portion of this collar is formed by a U-shaped ring 60 which is rigidly attached to the outer face of the surface 62 of the coolant injection assembly 52 thereby defining the inner chamber 63 of the collar 50. The outer chamber 64 of the collar 50 is formed by attaching a ring 65 of semi-circular cross section to the ring 60 by means of lock rings or lock cables 66. An airtight rubber seal 70 is provided between the mating surfaces of the ring 60 and the ring 64.

As stated above, the nozzles 56 are mounted at spaced intervals around the assembly 52 directly beneath the rings 60 and 65 which comprise the collar 50. Each of the nozzles has a hollow core 80 which is threaded into a drilled passage in the ring 60 and held in position by a nut 82. The external threads on the core 80 extend upwardly above the lower surface of the ring 60 to permit the nozzle cap 84 to be attached thereto. The upper surface of the cap 84 is flush with the inner face of the surface 62 of the assembly 52. When assembled, the upper portion of the core 80 of the nozzle is somewhat smaller than the inside diameter of the cap 84 thereby forming the annular chamber 90 therebetween.

One or more ports 92 are provided in the side wall of the cap 84 to permit liquid to pass from the chamber 63 inside the ring 60 through the chamber 90. The nozzle core 80 contains a central opening with a Venturi throat 94 for permitting the passage of air from within the chamber 64 of the ring 65 through the open top 95 of the nozzle. As air passes through the throat 94 its velocity is thereby increased, following which it mixes with the liquid passing through the open top 95 of the nozzle from the chamber 90 to produce an atomized spray. One or more connections 110 are provided in the ring 60 to permit the coolant liquid to be forced into the chamber 63 from the tank 40. Similar connections 112 are provided in the ring 65 to permit compressed air to enter the chamber 64 from the conduit 42 and valve 44. The connections 110 and 112 are preferably welded to the walls of their respective chambers. A typical installation for the fitting 110 is shown in Fig. 4.

Thus it can be seen that when additional power is to be derived from the power plant, the valves 44 and 57 are opened. Compressed air from the compressor outlet chamber 22 will pass through the conduits 32 and 36 to force liquid from the tank 40 through the valve 57, through the connection 110 into the chamber 63 of ring 60. The ports 92 permit the liquid to pass within the nozzle chamber 90 and then upwardly to the open top 95 of the nozzle. At the same time, compressed air also passes through the valve 44, through the connection 112 and into the chamber 64 of ring 65. From here it flows through the throat 94 of the core 80 where it mixes with the liquid coming from passage 90 to provide the desired atomization. Preferably, the air valve 44 is opened first to insure atomization when the liquid reaches the nozzles.

The core 80 of the nozzles can be properly adjusted by raising or lowering it along its threaded connection to increase or decrease the size of the chamber 90 in the vicinity of the opening 95. The nozzle core may also be varied in design according to the liquid-air ratio desired or according to the spray pattern necessary.

It should be pointed out that the coolant liquid is preferably composed of a mixture of pure or distilled water and alcohol. It is important that a distilled water or a pure liquid is used since any impurities present will precipitate during vaporization in the compressor. The alcohol obviously is used to prevent icing.

As a result of this invention it is apparent that a mechanism has been provided for continuously or intermittently injecting a coolant liquid into a gas turbine engine thereby increasing its over-all efficiency.

In addition a mechanism has been provided for injecting a liquid coolant into the compressor of a gas turbine power plant to increase the compressor efficiency and reduce the back-work ratio of the turbine power plant thereby increasing the total output and thermal efficiency of the turbine cycle.

This invention also provides a means for increasing the mass delivered by the compressor of a gas turbine to increase the total power output of the power plant. The mechanism providing the foregoing advantages is almost completely devoid of moving parts thereby making it particularly useful in aircraft where reliability is of primary importance.

Although only one embodiment of the invention has been disclosed in the accompanying description of the drawings it will be evident that various modifications can be made without departing from the scope of this novel concept.

I claim:

1. In a gas turbine power plant, a compressor having a discharge passage and mechanism for injecting a liquid coolant into said compressor including a coolant supply, an intake casing on said compressor, a plurality of mixing nozzles on the periphery of said casing forming passages therethrough, an annular collar enclosing said nozzles having inner and outer concentric chambers each communicating with said nozzles, a connection between said coolant supply and one of said chambers for supplying coolant thereto, a connection between said discharge passage and the other of said chambers for supplying compressed air thereto, and a connection between said discharge passage and said coolant supply for pressurizing the same.

2. In an axial flow turbo-jet power plant, a compressor, an air inlet for said compressor, a discharge passage from said compressor, means for increasing the mass of the air passing through said compressor while maintaining a constant volume rate of air flow through the latter comprising mechanism for injecting a coolant liquid into said compressor, said mechanism including a coolant supply, a first annular chamber surrounding said compressor inlet, a second annular chamber in juxtaposition to said first mentioned chamber, a connection between said first mentioned chamber and said coolant supply, a connection between said discharge passage of said compressor and said second mentioned chamber for supplying compressed air thereto, a connection between said discharge passage and said coolant supply for pressurizing the same, and means for introducing atomized coolant into said air stream passing through said inlet at spaced points about the periphery of said inlet including a series of nozzles, each nozzle having concentric passages communicating respectively with said first and said second chambers.

3. In an axial flow turbo-jet power plant having a casing, a compressor within said casing, an air inlet through an open end of said casing to said compressor, an outlet passage within said casing from said compressor, a plurality of injection nozzles in said casing adjacent said air inlet, a liquid supply externally of said casing, a hollow collar concentric with said casing and attached thereto and communicating with said injection nozzles, communicating means between said liquid supply and said collar, said conduit means from the outlet passage of said compressor to said liquid supply to force said liquid to said nozzles through said collar.

4. In an axial flow turbo-jet power plant having a casing, a multiple stage compressor within said casing, an air inlet through an open end of said casing before the first stage of said compressor, a discharge passage within said casing after the last stage of said compressor, a liquid coolant supply externally of said casing, a plurality of injection nozzles in said casing adjacent said air inlet for injecting said coolant into said air inlet before the first stage of said compressor, a first chamber attached to said casing and communicating with said nozzles and with said liquid coolant supply, a second chamber attached to said casing adjacent said first chamber attached to said casing and communicating with said nozzles and with said liquid coolant supply, a second chamber attached to said casing adjacent said first chamber, a conduit from said discharge passage to said second chamber for directing high pressure air thereto, and means for atomizing said liquid coolant in said nozzles including communicating means from said second chamber to said nozzles.

5. In an axial flow turbo-jet power plant having a casing, a multiple stage compressor within said casing, an air inlet through said casing to the first stage of said compressor, a discharge passage within said casing after the last stage of said compressor, a liquid coolant supply, an injection nozzle in said casing adjacent said air inlet for injecting said coolant into the air admitted to said compressor, a first chamber for the accumulation of said coolant communicating with said nozzle, communicating means between said coolant supply and said first chamber, a second chamber for the accumulation of high pressure air communicating with said nozzle for atomizing said coolant in said nozzle, a first conduit from said discharge passage to said coolant supply for forcing said coolant to said first chamber, and a second conduit from said discharge passage to said second chamber for providing high pressure air thereto.

6. In an axial flow turbo-jet engine having a casing, a multiple stage compressor within said casing, an air inlet to the first stage of said compressor through said casing, a plurality of injection nozzles in said casing for admitting coolant to the air admitted to said compressor, a discharge passage within said casing after the last stage of said compressor, a liquid coolant supply, a first hollow annular collar concentric with said casing for providing a chamber adjacent said nozzles and communicating therewith, communicating means between said coolant supply and said first collar for the passage of liquid coolant, a second hollow annular collar concentric with said casing for providing a second chamber communicating with said nozzles, a first conduit from said discharge passage to said liquid coolant supply for forcing the same to said first collar, and a second conduit from said discharge passage to said second collar for supplying high pressure air to said nozzle for atomizing said coolant as it passes through said nozzle.

References Cited in the file of this patent

UNITED STATES PATENTS

| Number | Name | Date |
|---|---|---|
| 1,400,813 | Graemiger | Dec. 20, 1921 |
| 1,824,893 | Holzwarth | Sept. 29, 1931 |
| 2,438,998 | Halford | Apr. 6, 1948 |

FOREIGN PATENTS

| Number | Country | Date |
|---|---|---|
| 3,607 | Great Britain | Feb. 21, 1905 |
| 111,381 | Great Britain | Nov. 29, 1917 |
| 372,377 | Great Britain | May 4, 1932 |
| 745,590 | France | Feb. 21, 1933 |